United States Patent
Han et al.

(10) Patent No.: US 10,634,079 B2
(45) Date of Patent: Apr. 28, 2020

(54) METHOD FOR IMPROVING ENGINE START PERFORMANCE OF VEHICLE

(71) Applicants: HYUNDAI MOTOR COMPANY, Seoul (KR); KIA MOTORS CORPORATION, Seoul (KR)

(72) Inventors: Jung-Suk Han, Hwaseong-si (KR); Kyong-Duck Park, Busan (KR); Min-Kyu Han, Hwaseong-si (KR); Hyeok-Jun Kwon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/179,267

(22) Filed: Nov. 2, 2018

(65) Prior Publication Data

US 2019/0195156 A1 Jun. 27, 2019

(30) Foreign Application Priority Data

Dec. 27, 2017 (KR) ........................ 10-2017-0181242

(51) Int. Cl.
*F02D 41/06* (2006.01)
*F02D 41/00* (2006.01)
*F02N 11/08* (2006.01)

(52) U.S. Cl.
CPC ......... *F02D 41/062* (2013.01); *F02D 41/009* (2013.01); *F02N 11/0833* (2013.01); *F02D 2041/0095* (2013.01); *F02N 2200/021* (2013.01); *F02N 2200/022* (2013.01)

(58) Field of Classification Search
CPC ................. F02D 41/062; F02D 41/009; F02D 2041/0095; F02N 11/0833; F02N 2200/021; F02N 2200/022
USPC ....... 123/491, 406.53, 406.54; 701/103–105, 701/112–113
See application file for complete search history.

(56) References Cited

U.S. PATENT DOCUMENTS

| | | | |
|---|---|---|---|
| 5,390,641 A * | 2/1995 | Yamada | F02D 41/062 123/480 |
| 9,133,776 B2 | 9/2015 | Shimizu | |
| 2003/0094160 A1* | 5/2003 | Tani | F02D 41/062 123/491 |
| 2005/0278109 A1* | 12/2005 | Ando | F02D 41/009 701/112 |
| 2016/0069316 A1* | 3/2016 | Miwa | B60W 20/40 123/179.3 |

FOREIGN PATENT DOCUMENTS

| | | |
|---|---|---|
| EP | 1344919 A2 | 9/2003 |
| JP | 2009-121250 | 6/2009 |
| JP | 2014-145331 A | 8/2014 |
| KR | 2000-0062889 A | 10/2000 |

* cited by examiner

*Primary Examiner* — Hai H Huynh
(74) *Attorney, Agent, or Firm* — Brinks Gilson & Lione

(57) ABSTRACT

A method for improving engine start performance of a vehicle performing engine synchronization at the time of the engine start may include performing a first synchronization task from an engine stop position stored when the engine stops in immediately previous traveling, and performing the first synchronization task when a crank signal of a crank sensor is first input to an engine position management (EPM) module.

6 Claims, 4 Drawing Sheets

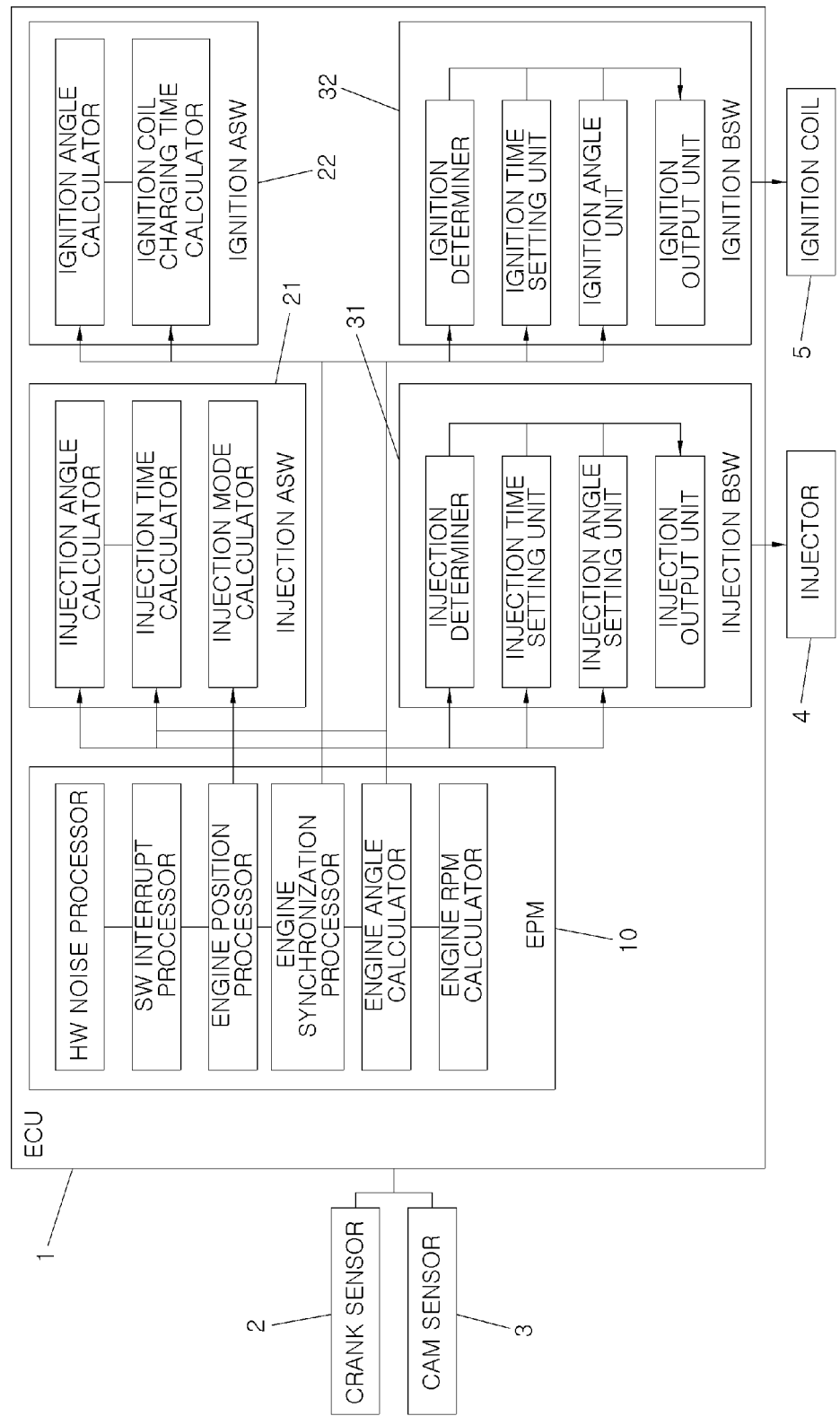
FIG. 1 "PRIOR ART"

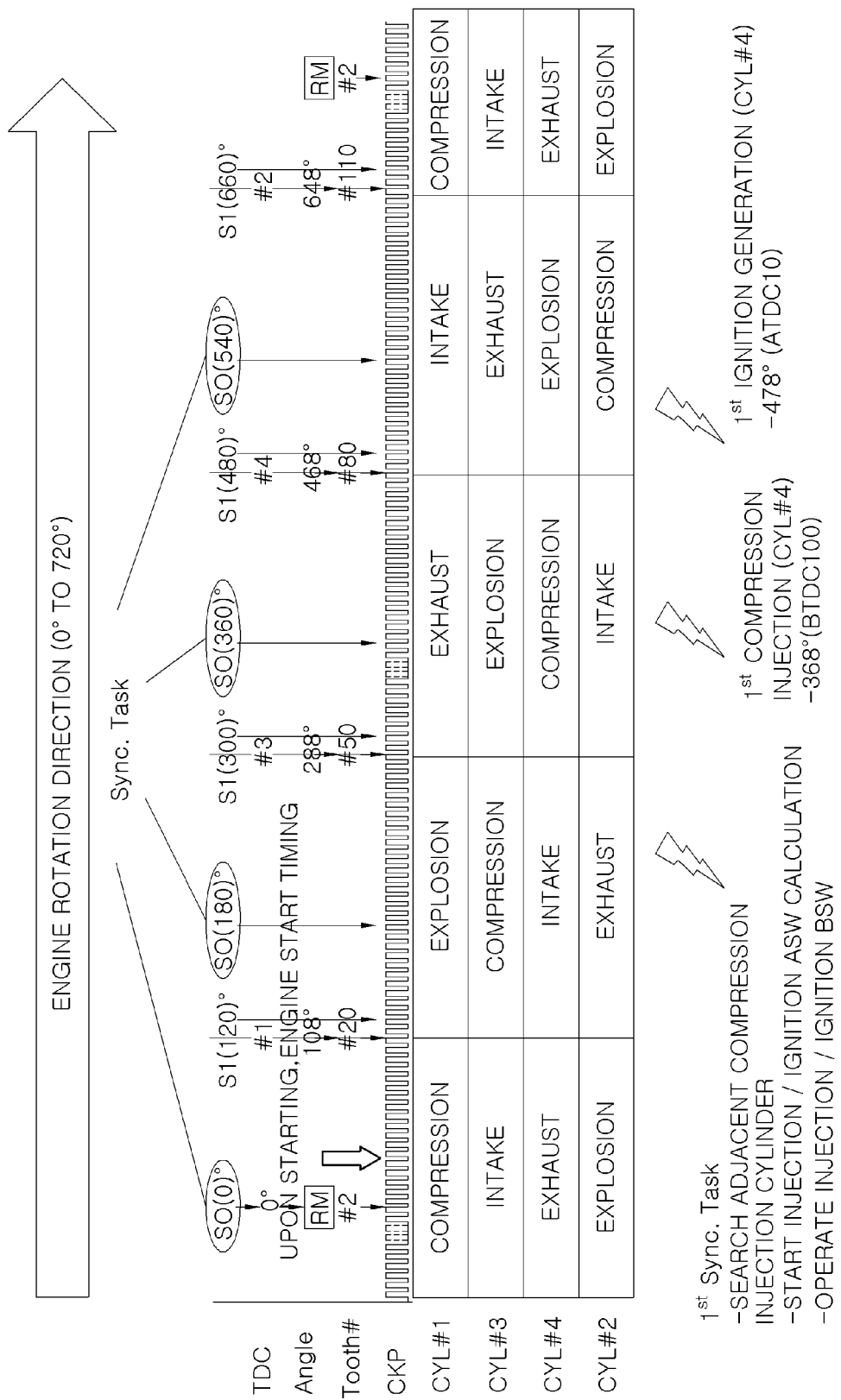
FIG. 2A "PRIOR ART"

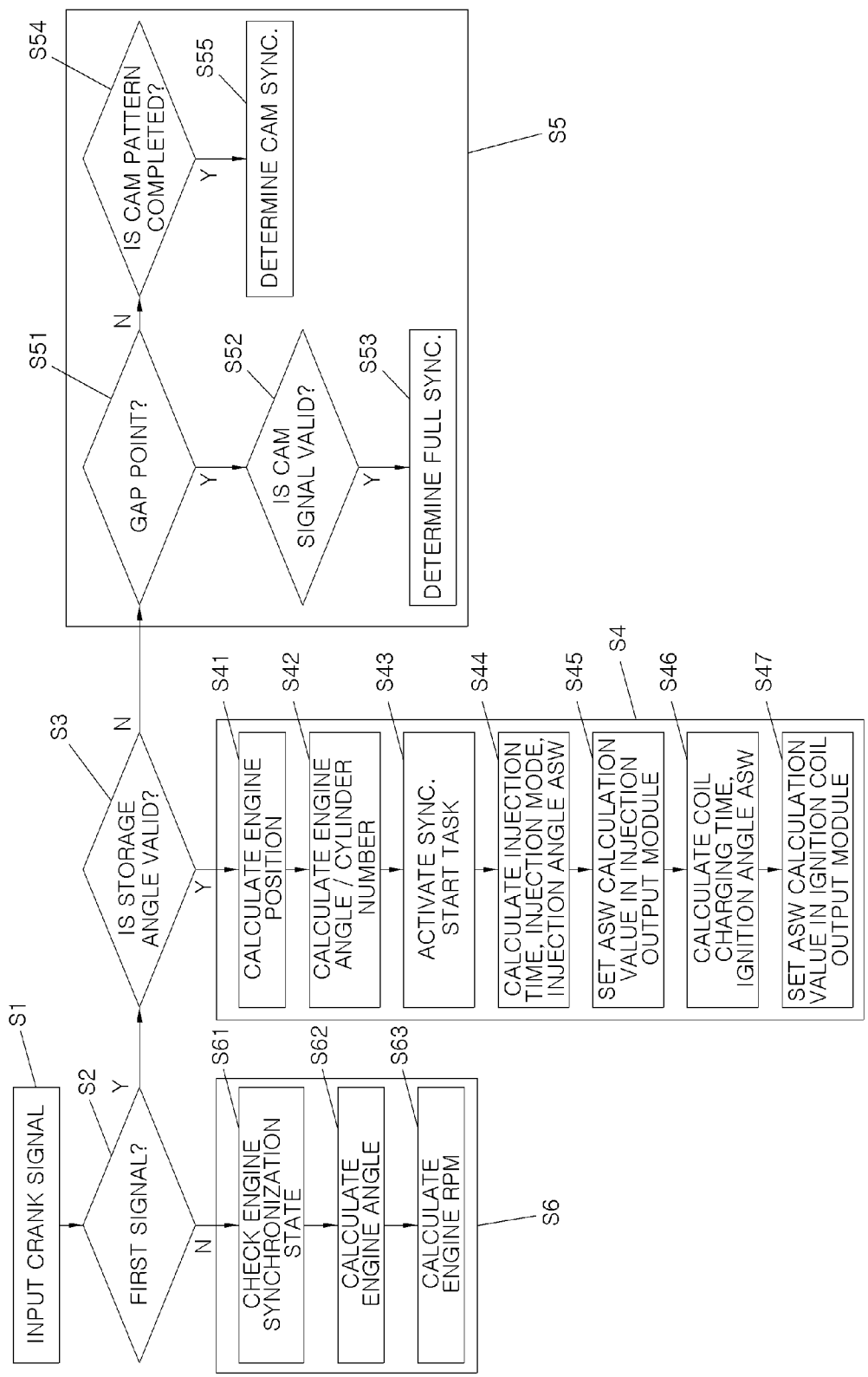

METHOD FOR IMPROVING ENGINE START PERFORMANCE OF VEHICLE

CROSS-REFERENCE TO RELATED APPLICATIONS

This application claims priority to and the benefit of Korean Patent Application No. 10-2017-0181242, filed on Dec. 27, 2017, the entire contents of which are incorporated herein by reference.

FIELD

Exemplary forms of the present disclosure relate to an engine start technique of a vehicle, and more particularly, to an idle stop and go (ISG) of a vehicle or a method for improving engine start performance.

BACKGROUND

The statements in this section merely provide background information related to the present disclosure and may not constitute prior art.

When an engine of a vehicle stops, an engine position management (EPM) module of an engine control unit (ECU) operates logic for tracking a stop position of the engine.

According to the related art, a stop position of the engine tracked at the time of stopping the engine is stored in a memory, and engine synchronization is performed immediately after starting the engine from the stored stop position of the engine to quickly activate a synchronization task related to injection and ignition before cam synchronization is made by a cam sensor signal and gap synchronization is made by a crank sensor signal, thereby shortening a start time.

However, we have discovered that even if the engine synchronization is performed immediately after the engine start, a first synchronization task (sync start task) is not activated until the engine should reach a specific position (e.g., 0°, 180°, 360°, and 540° in the case of a four-cylinder engine). Therefore, there is still time to waste up to the first synchronization task after the engine synchronization, and therefore there is a limit in shortening the start time.

SUMMARY

The present disclosure is directed to a method for improving engine start performance of a vehicle capable of shortening a start time by performing a first synchronization task without a delay immediately after engine synchronization.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, a method for improving engine start performance of a vehicle performing engine synchronization at the time of the engine start includes: performing, by a controller, a first synchronization task from an engine stop position stored when an engine stops in immediately previous traveling, and performing the first synchronization task when a crank signal of a crank sensor is first input to an engine position management (EPM) module.

The first synchronization task may include calculating a first injection timing and a first ignition timing by an application software (ASW) and setting a first injection and ignition task of a basic software (BSW).

In one form of the present disclosure, a method for improving engine start performance of a vehicle includes: inputting a crank signal from a crank sensor to an EPM module after the engine starts; determining, by a controller, whether the crank signal is a first input signal after the engine starts if the crank signal is input to the EPM module; determining, by the controller, whether a storage angle of an engine stop position stored at the time of the engine stop in immediately previous traveling is valid when the inputted crank signal is determined as the first input signal after the engine starts; and performing, by the controller, engine synchronization and a first synchronization task performing calculation and setting for first injection and first ignition in ASW and BSW by performing the engine synchronization at the storage angle and activating the first synchronization task if it is determined that the storage angle is valid.

In one form, when the inputted crank signal is not the first signal after the engine starts, the synchronization task sequentially performs: checking an engine synchronization state, calculating an engine angle, and calculating an engine revolutions per minute (RPM).

The method may further include: performing gap and cam synchronization for the engine synchronization using a missing tooth of a crank, or a cam pattern of an intake cam or an exhaust cam if it is determined that the storage angle is not valid in the determining whether the storage angle is valid.

In another form, the performing of the engine synchronization and the first synchronization task sequentially performs: calculating an engine position, calculating an engine angle and a cylinder number, activating the first synchronization task, calculating the first injection, setting the first injection, calculating the first ignition, and setting the first ignition.

In the calculating of the engine position and the calculating of the engine angle and the cylinder number, the EPM module may calculate the engine position and the engine angle and the cylinder number using the storage angle.

In the activating of the first synchronization task, the ASW and the BSW may activate the first synchronization task performing the calculation and setting for the first injection and first ignition.

In the calculating of the first injection, the setting of the first injection, the calculating of the first ignition, and the setting of the first ignition, the ASW may calculate an injection time, an injection mode, an injection angle, a coil charging time, and an ignition angle, and the BSW may set an event for operating an injector and an ignition coil depending on calculated values by the ASW.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a known ECU configuration diagram for performing engine synchronization and a synchronization task;

FIG. 2A is a diagram showing first injection and ignition timing according to first synchronization task timing in the related art for the case of a four-cylinder engine;

FIG. 3 is a flowchart showing each step of a method for improving engine start performance of a vehicle.

Figure 2B:
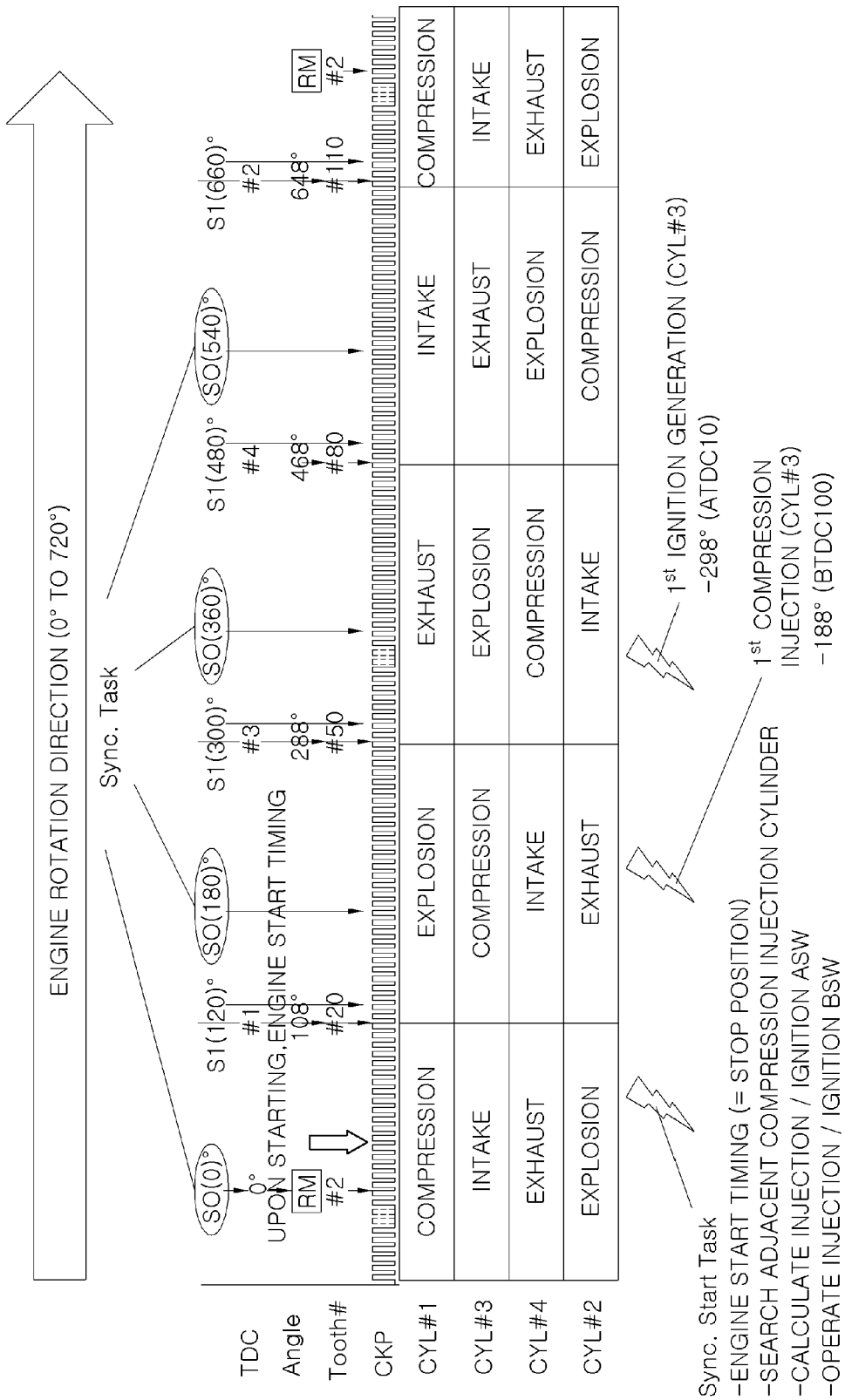
FIG. 2B is a diagram showing first injection and ignition timing according to first synchronization task timing for the case of the four-cylinder engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for improving engine start performance of a vehicle according to the present disclosure will be described in detail with reference to the accompanying drawings. However, a detailed description for well-known functions and configurations that may obscure the gist of the present disclosure will be omitted.

FIG. 1 is a known engine control unit (ECU) configuration diagram for performing engine synchronization and a synchronization task. Referring to FIG. 1, an ECU 1 is configured to include an engine position management (EPM) module 10 for performing engine synchronization, application software (ASW) 21 and 22 for calculating fuel injection and ignition timing, and basic software (BSW) 31 and 32 taking charge of actual fuel injection and ignition output.

The EPM module 10 may track a stop position of an engine when the engine stops, and store the tracked stop position in a memory. By this configuration, the EPM module 10 may accurately track the stop position of the engine because of accurately discriminating a forward rotation and a reverse rotation if a hall sensor is used as a crank sensor 2.

The method for improving engine start performance of a vehicle in one form of the present disclosure utilizes the fact that the engine synchronization is immediately performed from the stored engine stop position in the immediately previous traveling at the time of the engine start in the prior art to immediately perform the first synchronization task at a time when a crank signal of the crank sensor is first input, not at a defined angle (e.g., 0°, 180°, 360°, 540°) as in the related art to advance the injection and ignition calculation timing of the ASW 21 and 22 and the injection and ignition task setting timing, such that the actual injection timing and ignition timings are advanced as much as possible, thereby significantly shortening the start time.

FIGS. 2A and 2B are diagrams showing the difference between the first injection timing and the ignition timing according to the timing of the first synchronization task timing for the case of the four-cylinder engine in the prior art and the present disclosure.

Referring to FIG. 2A, according to the related art, when the engine start timing is near 18°, the time when the first synchronization task may be performed at the earliest becomes 180°. If the calculation of the injection and ignition of the ASW 21 and 22 starts at 180°, a compression injection may be made in cylinder No. 4 (CYL #4) in the case of a gasoline direct injection (GDI) engine, and if the ignition corresponding thereto is performed, an initial explosion occurs near about 478°.

On the other hand, referring to FIG. 2B, the present disclosure performs a first synchronization task immediately near about 18° which is the engine start timing. At this time, when an adjacent cylinder capable of performing the compression injection is found, this cylinder becomes cylinder No. 3 (CYL #3) and the injection and ignition calculation for the cylinder No. 3 (CYL #3) is performed in the ASW, and when the BSW 31 and 32 is ordered from the ASW 21 and 22 to operate an injector 4 and an ignition coil 5 of the cylinder No. 3 (CYL #3), the initial explosion occurs at about 298°. That is, the present disclosure can advance the initial explosion timing at a minimum of 180° or more as compared to the related art.

FIG. 3 is a flowchart showing each step of a method for improving engine start performance of a vehicle in one form of the present disclosure.

Referring to FIG. 3, the method for improving engine start performance of a vehicle includes: a step (S1) of inputting a crank sensor signal, a step (S2) of determining whether a signal is a first signal, a step (S3) of determining whether a storage angle is valid, a step (S4) of performing engine synchronization and a first synchronization task, a step (S5) of performing gap and cam synchronization, and a step (S6) of performing a synchronization task.

In the step (S1) of inputting the crank sensor signal, the crank signal of the crank sensor 2 is input to the EPM module 10 of the ECU 1 after the engine start.

If the crank signal is input to the EPM module 10 in the step (S1) of inputting the crank sensor signal, in the step (S2) of determining whether a signal is a first signal, it is determined whether the signal is the first input signal after the engine start. According to the determination result, if the signal is the first input signal after the engine start, the step (S3) of determining whether the storage angle is valid is performed and if it is determined that the signal is not the first input signal after the engine start, the step (S6) of performing the synchronization task is performed.

The step (S6) of performing the synchronization task is a step (S61) of performing a synchronization task as in the related art, and includes a step (S61) of checking an engine synchronization state, a step (S62) of calculating an engine angle, a step (S63) of calculating an engine RPM, and the like. This is the known technology and therefore a detailed description thereof will be omitted.

In the step (S3) of determining whether the storage angle is valid, it is determined whether the storage angle of the stored engine stop position at the time of the engine stop in the immediately previous traveling is valid. If the storage angle is valid, the step (S4) of performing the synchronization and first synchronization task is performed since the engine start position is accurately known.

If the storage angle is not valid, that is, if an abnormal value is stored as the engine stop position due to a memory error or the like, the value may not be used for the engine synchronization. Therefore, the step (S5) of performing the gap and cam synchronization for performing the engine synchronization using a missing tooth or a cam pattern of an intake cam or an exhaust cam is performed. The step (S5) of performing the gap and cap synchronization includes a step (S51) of determining a gap point, a step (S52) of determining whether a cam signal is valid, a step (S53) of determining a full synchronization, a step (S54) of determining whether a cam pattern is completed, a step (S55) of determining cam synchronization, or the like. This is the known technology and therefore a detailed description thereof will be omitted.

The step (S4) of performing the engine synchronization and first synchronization task includes a step (S41) of calculating an engine position, an step (S42) of calculating an engine angle and cylinder number, a step (S43) of activating a first synchronization task, a step (S44) of calculating injection, a step (S45) of setting injection, a step (S46) of calculating ignition, a step (S47) of setting ignition, or the like.

The step (S41) of calculating the engine position and the step (S42) of calculating the engine angle and cylinder number are steps of calculating the engine position, the engine angle, and the cylinder number from the storage angle in the EPM module 10, and the step (S43) of activating the first synchronization task is the step of activating the first synchronization task for calculation and setting the first injection and ignition.

If the first synchronization task is activated, the ASW 21 and 22 calculates the injection time, the injection mode, the injection angle, the coil charging time, the ignition angle, or the like and the BSW 31 and 32 sets an event for operating the injector and the ignition coil depending on the calculation values, sequentially execute the injection time, while the step (S44) of calculating the injection, the step (S45) of setting the injection, the step (S46) of calculating the ignition, and the step (S47) of setting the ignition are sequentially performed.

Thereafter, the BSW 31 and 32 operate the injector 4 and the ignition coil 5 depending on the set event to perform the injection and ignition.

The method for improving engine start performance of a vehicle in exemplary forms of the present disclosure can remarkably shorten the start time by making the first injection and ignition timing as early as possible by performing the first synchronous operation immediately after the crank sensor signal is first input.

In addition, the method for improving engine start performance of a vehicle can remarkably shorten the start time by advancing the first injection and ignition timing as early as possible by performing the first synchronization task immediately after the crank sensor signal is first input.

The foregoing exemplary forms are only examples to allow a person having ordinary skill in the art to which the present disclosure pertains (hereinafter, referred to as those skilled in the art) to easily practice the present disclosure. Accordingly, the present disclosure is not limited to the foregoing exemplary forms and the accompanying drawings, and therefore, a scope of the present disclosure is not limited to the foregoing exemplary forms. Accordingly, it will be apparent to those skilled in the art that substitutions, modifications and variations can be made without departing from the spirit and scope of the present disclosure as defined by the appended claims and can also belong to the scope of the present disclosure.

What is claimed is:

1. A method for improving engine start performance of a vehicle, the method comprising:
   inputting a crank signal from a crank sensor to an engine position management (EPM) module after an engine starts;
   determining, by a controller, whether the crank signal is a first input signal after the engine starts;
   determining, by the controller, whether a storage angle of an engine stop position stored at a time when the engine stop in immediately previous traveling is valid when the inputted crank signal is determined as the first input signal after the engine starts;
   performing, by the controller, engine synchronization and a first synchronization task performing calculation and setting for first injection and first ignition in an application software (ASW) and a basic software (BSW) by performing the engine synchronization at the storage angle and activating the first synchronization task when the storage angle is determined as being valid; and
   when the storage angle is determined as not being valid, performing gap and cam synchronization for the engine synchronization using a missing tooth of a crank, or a cam pattern of an intake cam or an exhaust cam.

2. The method of claim 1, wherein when the inputted crank signal is not the first signal after the engine starts, a synchronization task sequentially performs: checking an engine synchronization state, calculating an engine angle, and calculating an engine revolutions per minute (RPM).

3. The method of claim 1, wherein the performing of the engine synchronization and the first synchronization task sequentially performs: calculating an engine position, calculating an engine angle and a cylinder number, activating the first synchronization task, calculating the first injection, setting the first injection, calculating the first ignition, and setting the first ignition.

4. The method of claim 3, wherein the EPM module calculates the engine position, the engine angle, and the cylinder number using the storage angle.

5. The method of claim 3, wherein in the activating of the first synchronization task, the ASW and the BSW activate the first synchronization task performing the calculation and setting for the first injection and the first ignition.

6. The method of claim 3, wherein, in the calculating of the first injection, the setting of the first injection, the calculating of the first ignition, and the setting of the first ignition, the ASW calculates an injection time, an injection mode, an injection angle, a coil charging time, and an ignition angle, and the BSW sets an event for operating an injector and an ignition coil based on calculated values by the ASW.

* * * * *